Aug. 1, 1933. L. H. CLARK 1,920,461
MANUFACTURE OF MALT EXTRACT
Filed April 21, 1928 3 Sheets-Sheet 1

Fig. 1

INVENTOR
Lee H. Clark
BY Kenyon & Kenyon
ATTORNEY

Aug. 1, 1933.   L. H. CLARK   1,920,461
MANUFACTURE OF MALT EXTRACT
Filed April 21, 1928   3 Sheets-Sheet 2
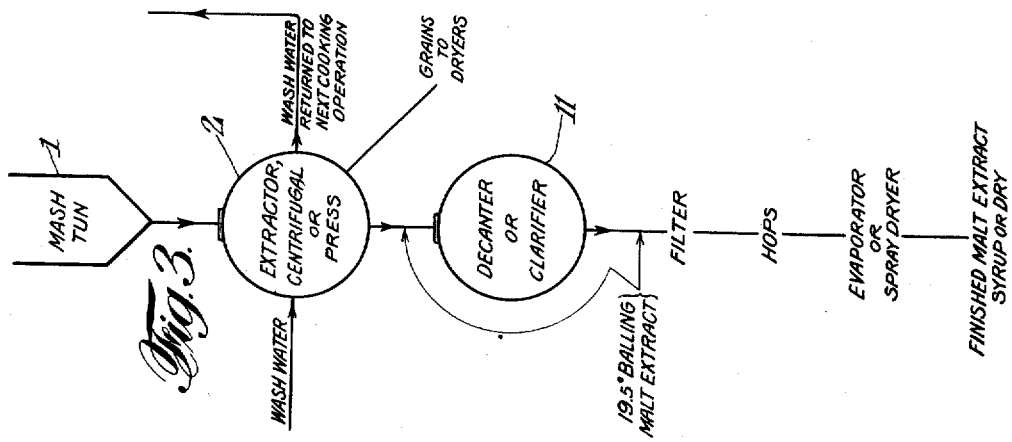
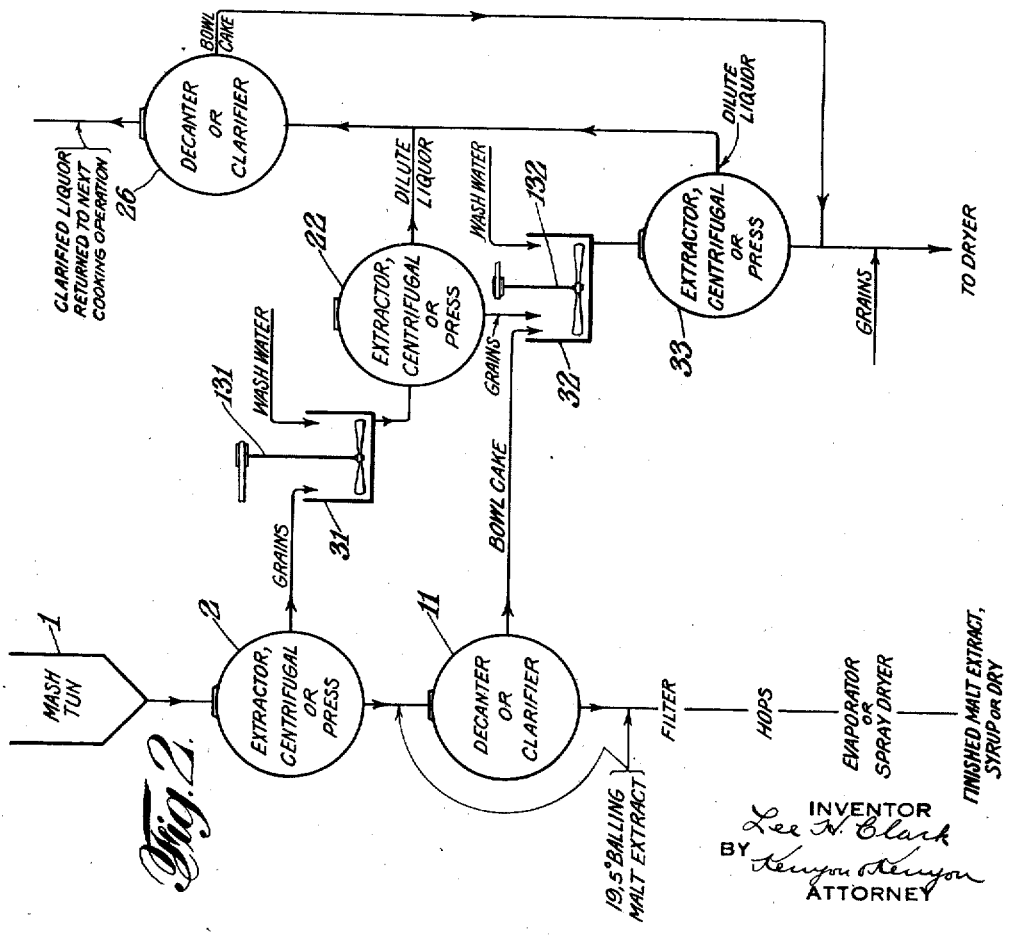
INVENTOR
Lee H. Clark
BY Kenyon & Kenyon
ATTORNEY Aug. 1, 1933.  L. H. CLARK  1,920,461
MANUFACTURE OF MALT EXTRACT
Filed April 21, 1928  3 Sheets-Sheet 3
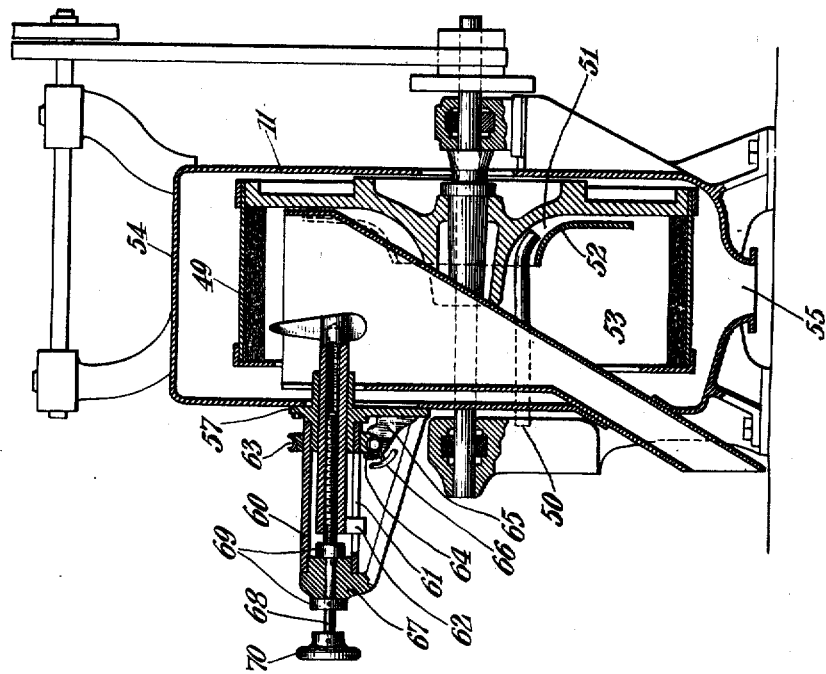

Patented Aug. 1, 1933

1,920,461

UNITED STATES PATENT OFFICE 1,920,461

MANUFACTURE OF MALT EXTRACT

Lee H. Clark, Ardmore, Pa., assignor to the Sharples Specialty Company, Philadelphia, Pa., a Corporation of Delaware Application April 21, 1928. Serial No. 271,958

8 Claims. (Cl. 195—24)

This invention relates to a process and apparatus for producing malt extract and malt beverages, particularly such malt beverages as are concentrated.

In producing malt extract and malt beverages in accordance with prior practice many difficulties and defects are encountered. Such prior practice consists generally in producing mash by heating the malt with water to a predetermined temperature and then draining the liquor from the resulting mash and then passing wash water through the drained or partially drained grains, cloudy drainings and wash water being returned to the top of the mash and clear drainings and wash water being carried to desired further treatment such as hopping, fermentation, and evaporation, according to the final product desired. The separation of liquids from solids being effected by gravity, it was necessary in order to obtain clear solution to carry out the draining and washing operation without agitation, in so far as possible, of the solids. One result of this was that large quantities of wash water had to be used and the clear liquid passing to the subsequent steps was necessarily in a dilute state. Another result was that the solids were left in a very wet state. The concentration of malt extract in the water contained in the wet grains may not have been high but the quantity of that water was so large that the loss of malt extract left in that water was large in the treatment of each batch of material. The wet grains required further expulsion of liquid before drying to produce cattle feed. Such expulsion of liquid caused the fine solids consisting mainly of protein and constituting the most valuable part of the solids to pass out with the liquid which also contained desirable extract. Discarding this liquid resulted in a loss of all that it contained; and filtration of it with a view to recovering such valuable fine solids and leaving the extract-containing water in condition to be used in a subsequent mashing operation, was an operation of such difficulty as to be seldom practicable in commercial operation. Another result of the separation of liquids from solids by gravity was that the solids had to be retained in a coarse state and the separating operation including the draining and washing had to be carried out with great care. In order to effect such a separation by gravity it was necessary that the hulls of the cereals be broken as little as possible and the starchy particles were therefore not ground to a fine state but consisted for the most part of large grains that could be converted in the mashing operation only with great difficulty. The harder starchy particles were never completely converted. If the starchy particles of the ground cereals were withdrawn from the large particles of hull and ground fine and remixed with the hulls there remained the difficulty that relatively large and hard particles of starch adhering to the hulls were not finely ground and were never completely converted. Another difficulty in the separation of liquids from solids was that even though every precaution was taken to preserve the hulls in the form of large particles, the percolation of water through the mass in the filter beds would frequently cease because of the packing and clogging action of the fine particles. In such case the mass would have to be agitated and the liquid flowing away would be cloudy and would have to be returned to the filter bed until the liquid flowing away became clear. Frequently channels would form through the filter bed and the desired amount of sparging water would have been used giving an extract of low concentration before all of the extract had been washed from the grains.

It is an object of this invention to provide a process and apparatus for producing malt extract, either in dry form or as a syrup, and malt beverages, whereby the foregoing and other defects and difficulties of prior practice may be eliminated and whereby such malt extract and malt beverages, and particularly concentrated malt beverages, may be rapidly and economically produced. A further object of this invention is to provide a process and apparatus whereby malt extract and malt beverages are produced in concentrated form prior to any concentrating steps. A further object of this invention is to provide a process and apparatus for producing malt extract and malt beverages, whereby a malt extract product and a solid product are produced, each of which is as free as possible of the other, and which together comprise substantially all of the useful constituents of the raw material. Important advantages of this invention are that the removal of fine solids from liquids is accomplished without difficulty and the separation of grains from liquor may therefore be carried out without regard to the clarity of the recovered liquor and there is substantially no limitation upon the fineness to which the malt may be ground and the conversion in the mashing operation is carried to a degree never before obtained commercially.

Other and further objects and advantages of this invention are set out in the following description or will be apparent in the light thereof to those skilled in the art.

In the practice of this invention the malt is prepared as desired and it is then ground to particles of desired size and then mashed in with hot water of which the temperature is controlled to effect the desired conversion of the malt. The liquor in the finished mash is then extracted mechanically, as by means of a centrifugal extractor, from the solids in an operation that produces dryer grains or solids than are obtainable in usual mash filtering operations and produces a liquid constituent that may be cloudy. The rate at which the mechanical extracting is carried on is not limited by the necessity for producing a clear liquid constituent as would be the case in separating solids by sedimentation to produce clear liquid. The liquid constituent is then clarified in a centrifugal decanter and it is then substantially free of solids and contains a relatively high concentration of malt extract and constitutes the only solution passing to the evaporator. The clarified liquid may be filtered and treated as desired, being passed, for example, to a hop kettle and then to an evaporator or to a spray dryer. One important advantage of the operation of this invention so far described is that the use of a mechanical extractor for draining the mash makes it possible to subject the malt to fine grinding prior to mashing with the result that a much higher degree of conversion of malt constituents occurs in this process than in former practice. For example, I found in a laboratory test that malt ground to coarse grains in accordance with the former practice of brewers resulted in a conversion of 66.1% while malt ground fine, as it may be in the practice of this invention, resulted in a conversion of 70.4% under identical conditions of mashing and conversion. Another advantage is that the solution, prior to the application of any separate steps acting to concentrate it, is of a much higher concentration than the final solution obtained in prior practice, and the extent of this advantage is not measured merely by the difference between the quantities of water to be evaporated. If the ingredients of the mash are so proportioned that the solution passing to the evaporator in the practice of this invention has a concentration of about 20° Balling, the solution passing to the evaporators, if the same mash were treated in accordance with prior practice, would have a concentration of only 12° Balling or less even under satisfactory operation; but it is known that molecular changes occur during evaporation that absorb heat without evaporation of water, and therefore there is not only more useful consumption of heat but also less loss of heat and of time when the solution passed to the evaporators is at a higher concentration. There is therefore an advantage, beyond that indicated by the difference in concentration, in feeding the more concentrated solution to the evaporating operation. Another advantage of the operation so far described is that the grains withdrawn from the extracting operation and the cake of fine solids withdrawn from the decanting or clarifying operation are dryer than bodies of solids obtained in prior practice and the malt extract embodied in them is removable with a smaller quantity of wash water. In fact a simplified application of this invention resides in leaving the grains in the extractor after as much concentrated malt extract solution as possible is extracted therefrom, and then washing the grains under the action of centrifugal force and collecting the wash water separately and returning it directly to the mashing operation from which it subsequently passes to the extracting, clarifying and evaporating steps. In such case the wet grains ultimately removed from the extractor may contain some malt extract but the loss may be insufficient to justify further treatment in accordance with this invention. Inasmuch as it is not necessary that the liquor removed from the grains shall be clear in the practice of this invention, various types of apparatus may be employed to effect removal of liquor from grains at any point in my process at which such a separation is made, for example, use may be made of a centrifugal extractor of which one form is herein described or of a press of which one form, known as the Anderson press or expeller, is generally described in United States Patents No. 829,314 and No. 829,315.

Further features of this invention are advantageous in the treatment of the wet grains obtained from the apparatus that drains the mash and of the cake of solids obtained from the clarifier; and such further features are so interrelated with the features so far described that only two products are produced, one of which is substantially clear malt extract and the other of which is dry feed that is relatively free of malt extract but contains substantially all of the solids that have not been converted into malt extract. The quantity of dry product so produced as feed is smaller than in prior practice because of the higher degree of conversion due to the fine grinding but it contains all of the unconverted solids and particularly the fine protein solids and is therefore more valuable per unit than the dried grains of prior practice.

In accordance with this invention the wet grains and the cake of solids from the clarifier are, as a general statement of the operation, so treated as to carry substantially all solids into the resulting feed and substantially all malt extract in such solids into a body of liquor that is used in the next mashing operation, to the end that the extract will ultimately pass to the evaporator or spray drying operation. The treatment involves washing but the fact that the substances washed are relatively dry before washing makes it possible to remove substantially all malt extract from the solids with a quantity of water not greater, and usually substantially less, than is necessary for the next mashing operation. The major portion of the wash water is withdrawn and then a further quantity of wash water is removed from the grains and all of the wash water is clarified and then all of the solids are brought together and dried, the clarified wash water being returned for the next mashing operation.

To assist in the further understanding of this invention there are described hereinafter specific embodiments and applications thereof in which the foregoing and other features of my invention are applied and included, but it is to be understood that this invention is not limited to the details of such embodiments and applications.

In the drawings in which like reference characters indicate similar parts.

Fig. 1 is a diagrammatic view of apparatus embodying my invention and whereby my process may be practised;

Fig. 2 shows diagrammatically a modification of the apparatus shown in Fig. 1;

Fig. 3 shows diagrammatically a simplified form of apparatus embodying one form of my invention and whereby one form of my method may be practised;

Fig. 4 is a detail view of one type of extractor suitable for use in the practice of my invention;

Fig. 5 is a detail view of one type of clarifier or decanter suitable for use in the practice of my invention.

Referring to Fig. 1 of the drawings, the malt, ground as finely as desired, is mashed in with the required amount of water or other make up liquor in mash tun 1. The mash in tun 1 is heated and agitated, in accordance with known principles, in such a manner as to produce a final converted product of desired characteristics. The finished mash is fed to mechanical extractor 2 as indicated by the solid line 3 representing the grains and light solids and the dotted line 4 indicating the concentracted liquor. The supply of finished mash to extractor 2 is continued until a sufficient large body of drained grains is accumulated therein. The concentracted liquor, which may be cloudy, is collected in tank 5 as indicated by dotted line 6, and then the supply to extractor 2 is discontinued and the grains are dislodged from the extractor and discharged into tank 7 as indicated by the solid line 8.

Liquor collected in tank 5 is passed by pump 9, as indicated by dotted line 10 to a centrifugal clarifier or decanter 11 from which clear concentrated liquor is passed to tank 12 as indicated by dotted line 13, and from tank 12 it is passed by pump 14, if necessary, to filter press 15 from which the concentrated liquor may be passed to any desired treatment such as treatment in a hop kettle or evaporators or spray dryers. Solids accumulated in the clarifier are discharged into grain tank 7 as indicated by the solid line 16 and solids accumulating in tank 7 are passed, as by conveyor 17, to washer 18 which may be of a type rendered effective by agitation and is advantageously of the counter-current type and may be of the form known as the Elmore continuous counter-current washer. Fresh hot water is supplied to the washer as indicated and the resulting dilute solution is passed to tank 19 as indicated by dotted line 20 while the washed solids are passed to an extractor, such as a centrifugal machine or a press or expeller 22 for removing further quantities of dilute liquid which are pased to tank 19 as indicated by dotted line 23, the resulting grain being passed to dryers as indiacted by solid line 24. Dilute liquid collected in tank 19 is passed by pump 25 to a centrifugal clarifier 26 as indicated by dotted line 27 and the resulting solids are passed to the dryers together with the last mentioned solids, as indicated by line 28, while resulting clarified liquid is passed to a receiving tank or to the mash tun 1 as indicated by the dotted line 29. After the solids have been thoroughly drained in extractor 2 wash water may be introduced which may be returned to the receiver or tun with or without subsequent clarification as indicated. The step of agitating and heating the malt with water in such a manner as to produce the desired product is hereinafter referred to as a mashing step.

As a merely illustrative example of the practice of this invention by the use of the apparatus and method shown in Fig. 1 of the drawings, stated with a view to illustrating the possibilities of my invention but with the understanding that my invention is not limited thereto, the charge in the mash tun may consist of 11,000 pounds of malt (containing about 5% water) and 31,450 pounds of water, which after the mashing in and conversion are finished (with 70.4% conversion) gives 7,750 pounds of malt extract (if measured dry), 2200 pounds of solids and 32,000 pounds of water. The first separating or extracting operation results in syrup (19.5° Balling) comprising 6580 pounds of extract, 160 pounds of solids and 27,185 pounds of water, and wet grains "A" comprising 1170 pounds of extract, 2540 pounds of solids, and 4815 pounds of water. Decanting or clarification of the syrup gives syrup (19.5° Balling) comprising 6445 pounds of extract 10 pounds of solids, 26,635 pounds of water, and bowl cake "A" comprising 135 pounds of extract, 150 pounds of solids, 550 pounds of water. The clarified syrup may be filtered if desired and then passed through the hop kettle and evaporated or spray dried to give 8115 pounds of syrup (20% water) or 6445 pounds of dried extract. Wet grains "A" and bowl cake "A" are washed, for example, with 25,000 pounds of fresh hot water of a temperature such that the resulting dilute solution is at the temperature of the mash tun when it reaches that point. After this washing operation the resulting wet grains "C" comprising 240 pounds of extract, 2340 pounds of solids, and 11,750 pounds of water may be treated in a centrifugal extractor or press to give wet grains "D" comprising 110 pounds of extract, 2240 pounds of solids and 5490 pounds of water, and dilute liquor "B" comprising 130 pounds of extract, 100 pounds of solids, 6260 pounds of water.

Dilute liquor "A" (5.4% Balling) resulting from the washing operation comprises 1065 pounds of extract, 350 pounds of solids, 18,615 pounds of water. Dilute liquors "A" and "B" are combined to form dilute liquor "C" (4.6° Balling) which is centrifugally decanted or clarified producing bowl cake "E" comprising 80 pounds of extract, 425 pounds of solids, 1585 pounds of water, and dilute liquor "D" comprising 1115 pounds of extract, 25 pounds of solids, 23,290 pounds of water, which is returned to a receiver or to the mash tun for the next mashing operation. Bowl cake "E" and wet grains "D" are combined and dried to produce feed consisting of 190 pounds of extract and 2665 pounds of solids.

By decanting or clarifying the liquid returned to the next mashing operation the fine solids, and particularly the protein, are brought into the dry feed and they do not accumulate or build up in the mashing operation and subsequent steps leading back to that operation.

Of course, the numerical quantities given above will vary greatly in the treatment of any particular mash in accordance with this invention because of the many possible variables such as variations in the character of the malt and in the treatment applied to the malt to convert its constituents and in the character of the final converted product and in the operation of the various steps.

In the modification shown in Fig. 2, the product of the mashing operation is passed to the separator or extractor 2 which may be a centrifugal machine or press and the liquid product is passed to the decanter or clarifier 11 and the clarified product is treated as described in connection with Fig. 1.

The solid product obtained from the separator or extractor 2 is passed to a tank 31 or other suitable vessel in which it is agitated, as by power operated agitator 131, with wash water, and the mixture is passed through a separator or extractor 22 which may be a centrifugal machine or a press. The resulting solid products and the cake from decanter 11 are agitated in a tank 32 or other suitable vessel, as by agitator 132, with a further quantity of wash water and the resulting mixture is passed through a separator or extractor 33 which may be a centrifugal machine or press. The dilute liquor from the separators or extractors 22 and 33 is passed through decanter or clarifier 26 and the clarified liquid is returned to a receiver or to the next mashing operation while the resulting cake of solids is mixed with the solids coming from separator or extractor 22 and passed to the drying operation.

In the modification shown in Fig. 3 the mixture from the mash tun 1 passes to the separator or extractor 2 and the resulting liquid product is treated as described in connection with Fig. 1, but the solid product is retained in the extractor and immediately washed, as by introducing wash water to the bowl of the centrifugal extractor, and the resulting dilute liquor is returned to a receiver or to the mash tun for the next mashing operation while the grains are passed to the drying operation. As in the previously described modifications the grains are dried to such an extent in the first extracting operation that little wash water is necessary to remove extract from the solid residue.

In the centrifugal extractor 2 that is shown in Fig. 4 a perforated bowl 35 is mounted on a horizontal shaft 36 supported in bearings 37 that are attached to the enclosing casing 38 and the supports 39 of the centrifugal machine. The mixture of liquids and solids is introduced to the bowl in any suitable manner as by supply pipe 40 that is provided with a discharge slot 41, and the liquid drains through the material and through the perforated bowl 35 into the casing 38 from which it is withdrawn at the discharge opening 42. When a sufficiently large body of solids has been collected the supply is discontinued and a brief period is allowed for the draining of the solids and then dislodging tool 43 is operated to dislodge the accumulated solids from the bowl. Tool 43 is mounted upon internally threaded rod 59 having a lug 62 that slides in slot 61 of hollow cylinder 60 that is mounted for rotation upon base 57 mounted on casing 38, being held in position on base 57 by bracket 67 that is also supported on base 57. Rod 68 is threaded into rod 59 and passes through bracket 67 and is held against longitudinal motion by collars 69. Rod 68 is rotated by hand wheel 70 to cause movement of tool 43 across the cake. Motion of hand wheel 66 (shown partly broken away) turns screw shaft 64 that is mounted in bracket 65 and that in turn rotates worm wheel 63 carried by cylindrical housing 60, and tool 43 is thereby swung toward and away from the cake in the bowl.

The particular mechanism for actuating dislodging tool 43 forms no part of this invention and may be of any known or suitable construction. Wash water may be sprayed into the perforate basket 35 through the perforations in pipe 56 after the solids have been drained, tool 43 being set to agitate the solids, if desired, during such spraying.

The decanter or clarifier 11 shown in Fig. 5 is similar to the centrifugal extractor but the bowl 49 is imperforate and separation is effected by subsidence or sedimentation as contrasted with the draining operation occurring in the extractor. The liquid to be clarified is fed through pipe 50 into the channel 51 formed between the base of the bowl and the frustoconical partition 52. Clarified liquid is withdrawn in any suitable manner from bowl 49 as by being discharged over the edge 53 of bowl 49 and collected in surrounding casing 54 and withdrawn therefrom through outlet 55; the cake dislodging mechanism being similar to that shown in Fig. 4.

In addition to the above mentioned features and advantages of this invention, it is pointed out that separation of liquid from the finished mash in the manner herein described makes it possible to sour the mash with lactic acid if desired because separation of the character herein described is not impaired by such a step. In prior practice the use of lactic acid promoted clogging of the mash filters and greatly augmented the difficulties above described that were encountered in the use of such mash filters. In the same connection it is pointed out that in all separations of liquids from solids in accordance with this invention the solids are so far freed of liquid that less malt extract is left with the solids even though the remaining liquid is more concentrated with malt extract, than was left with the solids in prior practice in which large quantities of dilute liquids were left with the solids. In prior practice the amount of liquid left with the solids was so great that it was necessary to use so much wash water that such residual liquid was low in extract concentration and the use of such large quantities of liquid brought into the extract substances that impaired the flavor thereof.

But in the practice of this invention the solids are so far freed of liquids that the use of relatively small quantities of wash water will leave in the residue even smaller quantity of extract than was left in the solids in prior practice and the danger of impairing the flavor of the extract is eliminated and the quantity of extract lost is minimized.

I claim:

1. In the manufacture of malt extract, the steps comprising mashing the malt with water, mechanically removing residual solids from the resulting liquor, washing the removed solids with fresh quantities of water, removing the wash water from the solids, and clarifying the wash water removed from the solids and returning it to the mashing operation.

2. In the manufacture of malt extract, the steps comprising mashing finely ground malt with not substantially more than three times its weight of water until the malt extract concentration of the liquid constituent of the mixture is substantially 19° Balling, separating from the resulting mixture the resulting liquor having a malt extract concentration of substantially 19° Balling, and clarifying the recovered extract, and thereby producing a substantially clear malt extract solution having a concentration of substantially 19° Balling.

3. In apparatus for the manufacture of malt extract, a mash tun for heating malt with water, an extractor, means for conducting mash from said tun to said extractor, a clarifier, means for conducting clarified liquid from said second from said extractor, means for washing the solids, means for conducting solids from said extractor and said clarifier to said washing means, a second clarifier, means for conducting wash water from grains washed in said washing means to said second clarifier, and means for conducting clarified liquid from said second clarifier to said tun.

4. In apparatus for the manufacture of malt extract, a mash tun for heating malt with water, an extractor, means for conducting mash from said tun to said extractor, a clarifier, means for conducting to said clarifier liquid discharged from said extractor, means for washing solids, means for conducting solids from said extractor and said clarifier to said washing means, a second clarifier, means for conducting wash water from grains washed in said washing means to said second clarifier, means for conducting clarified liquid from said second clarifier to said tun and means for bringing together solids recovered in said second clarifier and washed grains substantially freed of wash water.

5. In apparatus for the manufacture of malt extract, a mash tun for heating malt with water, an extractor, means for conducting mash from said tun to said extractor, a clarifier, means for conducting to said clarifier liquid discharged from said extractor, means for washing solids, means for conducting solids from said extractor and said clarifier to said washing means, means for mechanically separating liquids from solids, means for conducting mixture of grains and liquor from said washing means to said separating means, a second clarifier, means for conducting liquid from said separator to said second clarifier, and means for conducting liquid from said second clarifier to said tun.

6. In the manufacture of malt extract, the steps comprising mashing the malt with water, mechanically separating the resulting liquor from the residual grains, centrifugally clarifying the resulting liquor, washing with water the solids collected in said clarifying step and the grains separated from the liquor, removing the wash-water from the solids mixed therewith in said washing step, centrifugally clarifying the removed wash-water, and returning the clarified wash-water to the mashing operation.

7. In the manufacture of malt extract, the steps comprising mashing the malt with water, mechanically separating the residual grains from the resulting liquor, centrifugally clarifying the liquor separated from the residual grains, washing with fresh quantities of water the residual grains separated from the liquor, and centrifugally clarifying the wash-water and combining the washed grains and the solids resulting from both of said clarifying operations.

8. In the manufacture of malt extract, the steps comprising mashing the malt with water, mechanically separating the resulting liquor from the residual grains, centrifugally clarifying the resulting liquor, bringing fresh quantities of wash-water into washing relation with the residual grains separated from the liquor and separating it from the residual grains and then subjecting it to centrifugal clarification, and contacting the solids collected in said first-mentioned clarifying operation with the wash water prior to said second-named clarifying operation.

LEE H. CLARK.

CERTIFICATE OF CORRECTION.

Patent No. 1,920,461.　　　　　　　　　　　　　　　　　　August 1, 1933.

LEE H. CLARK.

It is hereby certified that error appears in the printed specification of the above numbered patent requiring correction as follows: Page 5, line 7, claim 3, strike out the words "clarified liquid from said second" and insert instead "to said clarifier liquid discharged"; and that the said Letters Patent should be read with this correction therein that the same may conform to the record of the case in the Patent Office.

Signed and sealed this 24th day of October, A. D. 1933.

F. M. Hopkins (Seal)　　　　　　　　　　　　　　　　　　　　　　Acting Commissioner of Patents.

extract solution having a concentration of substantially 19° Balling.

3. In apparatus for the manufacture of malt extract, a mash tun for heating malt with water, an extractor, means for conducting mash from said tun to said extractor, a clarifier, means for conducting clarified liquid from said second from said extractor, means for washing the solids, means for conducting solids from said extractor and said clarifier to said washing means, a second clarifier, means for conducting wash water from grains washed in said washing means to said second clarifier, and means for conducting clarified liquid from said second clarifier to said tun.

4. In apparatus for the manufacture of malt extract, a mash tun for heating malt with water, an extractor, means for conducting mash from said tun to said extractor, a clarifier, means for conducting to said clarifier liquid discharged from said extractor, means for washing solids, means for conducting solids from said extractor and said clarifier to said washing means, a second clarifier, means for conducting wash water from grains washed in said washing means to said second clarifier, means for conducting clarified liquid from said second clarifier to said tun and means for bringing together solids recovered in said second clarifier and washed grains substantially freed of wash water.

5. In apparatus for the manufacture of malt extract, a mash tun for heating malt with water, an extractor, means for conducting mash from said tun to said extractor, a clarifier, means for conducting to said clarifier liquid discharged from said extractor, means for washing solids, means for conducting solids from said extractor and said clarifier to said washing means, means for mechanically separating liquids from solids, means for conducting mixture of grains and liquor from said washing means to said separating means, a second clarifier, means for conducting liquid from said separator to said second clarifier, and means for conducting liquid from said second clarifier to said tun.

6. In the manufacture of malt extract, the steps comprising mashing the malt with water, mechanically separating the resulting liquor from the residual grains, centrifugally clarifying the resulting liquor, washing with water the solids collected in said clarifying step and the grains separated from the liquor, removing the wash-water from the solids mixed therewith in said washing step, centrifugally clarifying the removed wash-water, and returning the clarified wash-water to the mashing operation.

7. In the manufacture of malt extract, the steps comprising mashing the malt with water, mechanically separating the residual grains from the resulting liquor, centrifugally clarifying the liquor separated from the residual grains, washing with fresh quantities of water the residual grains separated from the liquor, and centrifugally clarifying the wash-water and combining the washed grains and the solids resulting from both of said clarifying operations.

8. In the manufacture of malt extract, the steps comprising mashing the malt with water, mechanically separating the resulting liquor from the residual grains, centrifugally clarifying the resulting liquor, bringing fresh quantities of wash-water into washing relation with the residual grains separated from the liquor and separating it from the residual grains and then subjecting it to centrifugal clarification, and contacting the solids collected in said first-mentioned clarifying operation with the wash water prior to said second-named clarifying operation.

LEE H. CLARK.

CERTIFICATE OF CORRECTION.

Patent No. 1,920,461.                      August 1, 1933.

LEE H. CLARK.

It is hereby certified that error appears in the printed specification of the above numbered patent requiring correction as follows: Page 5, line 7, claim 3, strike out the words "clarified liquid from said second" and insert instead "to said clarifier liquid discharged"; and that the said Letters Patent should be read with this correction therein that the same may conform to the record of the case in the Patent Office.

Signed and sealed this 24th day of October, A. D. 1933.

F. M. Hopkins (Seal)                                        Acting Commissioner of Patents.

CERTIFICATE OF CORRECTION.

Patent No. 1,920,461.                                                          August 1, 1933.

LEE H. CLARK.

It is hereby certified that error appears in the printed specification of the above numbered patent requiring correction as follows: Page 5, line 7, claim 3, strike out the words "clarified liquid from said second" and insert instead "to said clarifier liquid discharged"; and that the said Letters Patent should be read with this correction therein that the same may conform to the record of the case in the Patent Office.

Signed and sealed this 24th day of October, A. D. 1933.

F. M. Hopkins (Seal)                                                                 Acting Commissioner of Patents.